(12) United States Patent
Hruska et al.

(10) Patent No.: US 8,860,569 B2
(45) Date of Patent: Oct. 14, 2014

(54) AUTOMATIC DETECTION AND OFFLOADING OF DATA LOGGER SENSED DATA

(71) Applicant: Onset Computer Corporation, Bourne, MA (US)

(72) Inventors: Mark Hruska, Bourne, MA (US); Donald F. Clark, Sr., Fernandina Beach, FL (US); Erich George Roth, North Falmouth, MA (US); David M. Pitta, East Sandwich, MA (US)

(73) Assignee: Onset Computer Corporation, Bourne, MA (US)

( * ) Notice: Subject to any disclaimer, the term of this patent is extended or adjusted under 35 U.S.C. 154(b) by 32 days.

(21) Appl. No.: 13/836,919

(22) Filed: Mar. 15, 2013

(65) Prior Publication Data

US 2014/0266688 A1    Sep. 18, 2014

(51) Int. Cl.
  *G08B 1/08* (2006.01)
  *G08C 17/02* (2006.01)
(52) U.S. Cl.
  CPC ............................... *G08C 17/02* (2013.01)
  USPC .................. 340/539.1; 340/568.1; 340/572.1
(58) Field of Classification Search
  USPC .......... 340/539.1, 531, 3.1, 501, 506, 539.26, 340/539.22, 870.01, 539.11, 3.3, 568.1, 340/572.1
  See application file for complete search history.

(56) References Cited

U.S. PATENT DOCUMENTS

| | | | | |
|---|---|---|---|---|
| 7,369,945 | B2* | 5/2008 | Miller et al. | 702/24 |
| 7,963,326 | B2* | 6/2011 | Giacomino | 166/250.15 |
| 2004/0015318 | A1* | 1/2004 | Heller et al. | 702/127 |
| 2006/0145840 | A1* | 7/2006 | Klun | 340/539.22 |
| 2008/0231453 | A1* | 9/2008 | Corder | 340/572.1 |
| 2011/0122858 | A1* | 5/2011 | Yashiro et al. | 370/338 |
| 2014/0009306 | A1* | 1/2014 | Haupt et al. | 340/870.09 |

OTHER PUBLICATIONS http://www.digikey.com/web%20export/supplier%20content/TI_296/mkt/health/wireless-sensor.pdf?redirected=1 "www.digikey.com_wireless-sensor.pdf".
http://www.dcrainmaker.com/2012/01/wahoo-fitness-blue-hr-bluetooth-low.html "Wahoo_Fitness_Blue_HR_Bluetooth_Smart Heart_Rate_Strap_Review.pdf".
http://www.kickstarter.com/projects/parasitx/the-beerbugtm-digital-hydrometer "The_BeerBug_TM.pdf".
10385-G-MAN-UTBI-001.pdf.
1031_F_MAN_DTA128B.pdf.
10264-H-MAN-U-DTW-1.pdf.

* cited by examiner

*Primary Examiner* — Daniel Previl
(74) *Attorney, Agent, or Firm* — Leon Fortin Jr

(57) ABSTRACT

Automatically detecting a wireless data logger with a multi-network wireless mobile gateway via low energy radio network-based proximity detection enables automatically transferring data logger sensed data that includes a portion of previously logged data from the wireless data logger via the low energy network to the multi-network mobile wireless gateway for further transfer from the multi-network wireless mobile gateway to a host via a second network.

13 Claims, 7 Drawing Sheets

AUTOMATIC DETECTION AND OFFLOADING OF DATA LOGGER SENSED DATA

BACKGROUND

1. Field

The methods and systems herein disclosed generally relate to data logging devices. The methods and systems herein disclosed particularly relate to transferring of logged data of the data logging devices to a server through a gateway using different networks.

2. Description of the Related Art

Data loggers are often used to measure environmental parameters such as temperatures, humidity, pressure, and the like. These environmental parameters are measured by various sensors embedded in the data loggers. In the past, these data loggers have been used for generating signals and alarms. For example, if a particular threshold in a particular unit of the factory exceeds a pre-defined temperature and humidity, these data loggers may generate an alert signal, thereby signalling a threat or a precarious situation. In addition, these data loggers include memory storage that stores data sensed at different points of time and convert sensed data into values which are readable by a human, i.e., temperature in degrees Fahrenheit, humidity in a percentage, and the like.

The data logged by the data loggers needs to be transmitted on a regular basis to a central server for analysis. For example, while choosing a particular location for installing an additional machine in the plant, a project engineer may need to know the variable temperature and humidity conditions at that place on regular intervals. In such cases, such data loggers must be locally accessed for data retrieval. Also, such data loggers may not allow for remote control of the system (i.e., such as allowing the user to change the measurement parameters). Thus, such systems require that a specially trained individual visit each monitoring station to obtain the data required for analysis.

In another instance, it may be required to monitor or assess a building that allows changes in humidity and/or temperature associated with a loss of structural integrity. In this scenario, the data from multiple data loggers situated at various places in the building as well as the data loggers situated in the nearby buildings needs to be analyzed. The analysis of the data may help to compare conditions in one building with the conditions at similarly situated buildings.

In the stated use case scenarios and many other use case scenarios, it is evident that the seamless transfer of data from the data loggers are as important as sensing and logging the data in the data loggers. In light of the above discussion, there is a need for a system that may enable the data transfer from the data loggers in an efficient manner. In addition, the data transfer needs to secured as well as should require minimal manual interference.

SUMMARY

The present invention may provide methods and systems for transferring the logged data via a multi-network wireless mobile gateway. The methods and systems may include automatically detecting a wireless data logger with a multi-network wireless mobile gateway via low energy radio network-based proximity detection, automatically transferring data logger sensed data that may include a portion of previously logged data from the wireless data logger via the low energy network to a multi-network mobile wireless gateway, and transferring the logged data from the multi-network wireless mobile gateway to a host via a second network. The automatic transfer may be in response to the automatic detecting the wireless data logger.

In the method, the automatically transferred data logger sensed data may include transfer of real-time data after each capture of sensed data. The automatically transferring data logger sensed data may include transfer of real-time data synchronously with a request for a real-time data transfer from the gateway to the wireless data logger. A portion of the previously logged data may include summary data.

Further in the method, the wireless data logger may include an LCD screen visible on a front face of an enclosure, at least one of a relative humidity sensor and a temperature sensor accessible on the front face of the enclosure, mounting loops disposed on opposite ends of the wireless data logger, at least two wireless data logger configuration buttons accessible on a surface of the wireless data logger, and a low energy wireless communication port for proximity detection and data transfer. The wireless data logger may sense and log temperature, relative humidity, salinity, water temperature and may be submersible in a liquid.

Further in the method, the wireless data logger proximity detection by the multi-network wireless mobile gateway of the wireless data logger may require validation that the gateway may be authorized to access the wireless data logger based on a wireless data logger-specific control key stored in the wireless data logger.

In another aspect, the method may include automatically detecting a plurality of wireless data loggers with a multi-network wireless mobile gateway via low energy radio network-based proximity detection and automatically transferring data logger sensed data that may include a portion of previously logged data from a portion of the plurality of wireless data loggers via the low energy network to the multi-network mobile wireless gateway. The offloading data from one of the plurality of wireless data loggers may occur while the one of wireless data loggers may be in detectable proximity of the multi-network wireless mobile gateway. The offloading may be independent of continued proximity detection of the others of the plurality of wireless data loggers by the multi-network wireless mobile gateway.

Further in the method, the at least one of the wireless data loggers may include an LCD screen visible on a front face of an enclosure, at least one of a relative humidity sensor and a temperature sensor accessible on the front face of the enclosure, mounting loops disposed on opposite ends of the wireless data logger, at least two wireless data logger configuration buttons accessible on a surface of the wireless data logger, and a low energy wireless communication port for proximity detection and data transfer. The at least one of the wireless data logger may sense and log temperature, relative humidity, salinity, water temperature and may be submersible in a liquid. The at least one of the wireless data logger may sense and log temperature, salinity and water temperature of the liquid.

Further in the method, the proximity detection of the wireless data logger may require validation that the multi-network wireless mobile gateway may be authorized to access the wireless data logger based on a wireless data logger-specific control key stored in the wireless data logger.

In another aspect, a method of wireless data logger location validation may include determining a GPS location of a wireless data logger installation site, transmitting the GPS installation site location from a mobile gateway to the wireless data logger via a low energy wireless network and storing the GPS installation site location into a memory accessible by the gateway, using the GPS installation site location to position a multi-network wireless mobile gateway substantially at the installation site location, automatically detecting proximity of the wireless data logger via wireless low energy network-based proximity detection with the positioned multi-network wireless mobile gateway device, adjusting a position of the multi-network wireless mobile gateway to reduce the estimated distance between the gateway and the logger based on feedback indicative of a distance between the gateway and the wireless data logger, retrieving the GPS installation site location from the wireless data logger and comparing a current GPS location of the gateway with the retrieved GPS installation site location to validate wireless data logger location.

Further in the method, the feedback indicative of a distance between the gateway and the wireless data logger may be based on a measure of communication between the gateway and the wireless data logger via the low-energy wireless network. The memory accessible by the gateway for storing the GPS installation site location may be integrated into the wireless data logger. The memory accessible to the gateway for storing the GPS installation site location may be accessible over a wireless network other than the low energy network.

The wireless data logger may sense and log at least one of temperature, relative humidity, salinity, and water temperature. The feedback may be an audio feedback that may vary in at least one of volume, pitch, frequency, and tone based on a measure of distance between the wireless data logger and the gateway. The feedback may be presented on the gateway display screen and may vary in at least one of colour, brightness, flash rate, numerical value, and duty cycle based on a measure of distance between the wireless data logger and the gateway.

The automatically detecting proximity of the wireless data logger may require validation that the mobile gateway may be authorized to access the wireless data logger based on a wireless data logger-specific control key stored in the wireless data logger.

The wireless data logger may include an LCD screen visible on a front face of an enclosure, at least one of a relative humidity sensor and a temperature sensor accessible on the front face of the enclosure, mounting loops disposed on opposite ends of the wireless data logger, at least two wireless data logger configuration buttons accessible on a surface of the wireless data logger, and a low energy wireless communication port for proximity detection and data transfer.

In another aspect, a wireless, submersible wireless data logger may include a housing sealed to facilitate immersion in pressurized liquids, a plurality of sensors for sensing at least two of temperature of a liquid, salinity of the liquid, and water temperature of the liquid, a memory for holding a plurality of sensor sensing values, a low energy wireless network capability and a processor for executing an automatic proximity detection program. The automatic proximity detection program may include the steps of transmitting a detection data value over the network, determining if a response is received via the network and based on a result of determining if a response is received, performing one of pausing for a minimum duration and then retransmitting the detection data value over the network, and communicating via the network with a multi-network wireless mobile gateway that provided the response.

The automatic proximity detection program may include validation that the gateway may be authorized to access the wireless data logger based on a wireless data logger-specific control key stored in the wireless data logger.

In another aspect, a wireless, submersible wireless data logger may include a housing sealed to facilitate immersion in pressurized liquids, a sensor disposed in close proximity to a first sensing surface of the wireless data logger to sense at least one of temperature, salinity, and water temperature of a liquid and a sensor disposed in close proximity to a second sensing surface of the wireless data logger to sense at least one of temperature, salinity, and water temperature of a liquid, a memory for holding a plurality of sensed data values and a low energy wireless network interface. The first and second sensing surfaces may comprise opposite sides of the wireless data logger.

In another aspect, a method may include automatically replicating a display of a wireless data logger on a display screen of a multi-network wireless mobile gateway while the gateway and wireless data logger communicate via a low energy wireless network. The data for replicating the wireless data logger display may be transferred from the wireless data logger to the gateway via the wireless low energy network, and the automatic replication may be in response to automatic wireless low energy network-based wireless data logger proximity detection by the wireless mobile gateway.

The wireless data logger may include an LCD screen visible on a front face of an enclosure, at least one of a relative humidity sensor and a temperature sensor accessible on the front face of the enclosure, mounting loops disposed on opposite ends of the wireless data logger, at least two wireless data logger configuration buttons accessible on a surface of the wireless data logger, and a low energy wireless communication port for proximity detection and data transfer.

The wireless data logger may sense and log at least one of temperature, relative humidity, and salinity. The wireless data logger may be submersible in a liquid and may log temperature and salinity of the liquid. The automatically replicating may include replication of a front view of the wireless data logger including the wireless data logger display. The automatically replicating may include replication of the wireless data logger display combined with a preconfigured image of the wireless data logger. The preconfigured image of the wireless data logger may be an image extracted from a photograph of wireless data logger as installed. The automatic replication of the display of the wireless data logger may be updated in real-time by transferring updated wireless data logger display data to the gateway.

The proximity detection of the wireless data logger may require validation that the mobile gateway may be authorized to access the wireless data logger based on a wireless data logger-specific control key stored in the wireless data logger.

In another aspect, a method includes automatically replicating a display of a plurality of wireless data loggers automatically on a display screen of a multi-network wireless mobile gateway while the gateway and wireless data loggers communicate via a low energy wireless network. The data for replicating the wireless data logger displays may be transferred from the wireless data loggers to the gateway via the wireless low energy network. The automatic replication may be in response to automatic wireless low energy network-based wireless data logger proximity detection of each of the plurality of wireless data loggers by the wireless mobile gateway.

In another aspect, a system may include a plurality of wireless data loggers, a multi-radio network enabled wireless bridge, an Internet gateway, and a web server executing remote wireless data logger monitoring and management software. The plurality of wireless data loggers may communicate with the multi-radio network enabled wireless bridge via low energy wireless networking. The multi-radio network enabled wireless bridge may communicate via the wireless networking other than low energy wireless networking with the Internet gateway and the internet gateway may communicate with the web server. The wireless data logger data may be transferred from the plurality of wireless data loggers via the bridge to the Internet gateway and then to the web server where the wireless data logger data may be accessible by a plurality of remotely located users.

The at least one of the plurality of wireless data loggers may include an LCD screen visible on a front face of an enclosure, at least one of a relative humidity sensor and a temperature sensor accessible on the front face of the enclosure, mounting loops disposed on opposite ends of the wireless data logger, at least two wireless data logger configuration buttons accessible on a surface of the wireless data logger, and a low energy wireless communication port for proximity detection and data transfer.

BRIEF DESCRIPTION OF THE FIGURES

The invention and the following detailed description of certain embodiments thereof may be understood by reference to the following figures.

Figure 1:
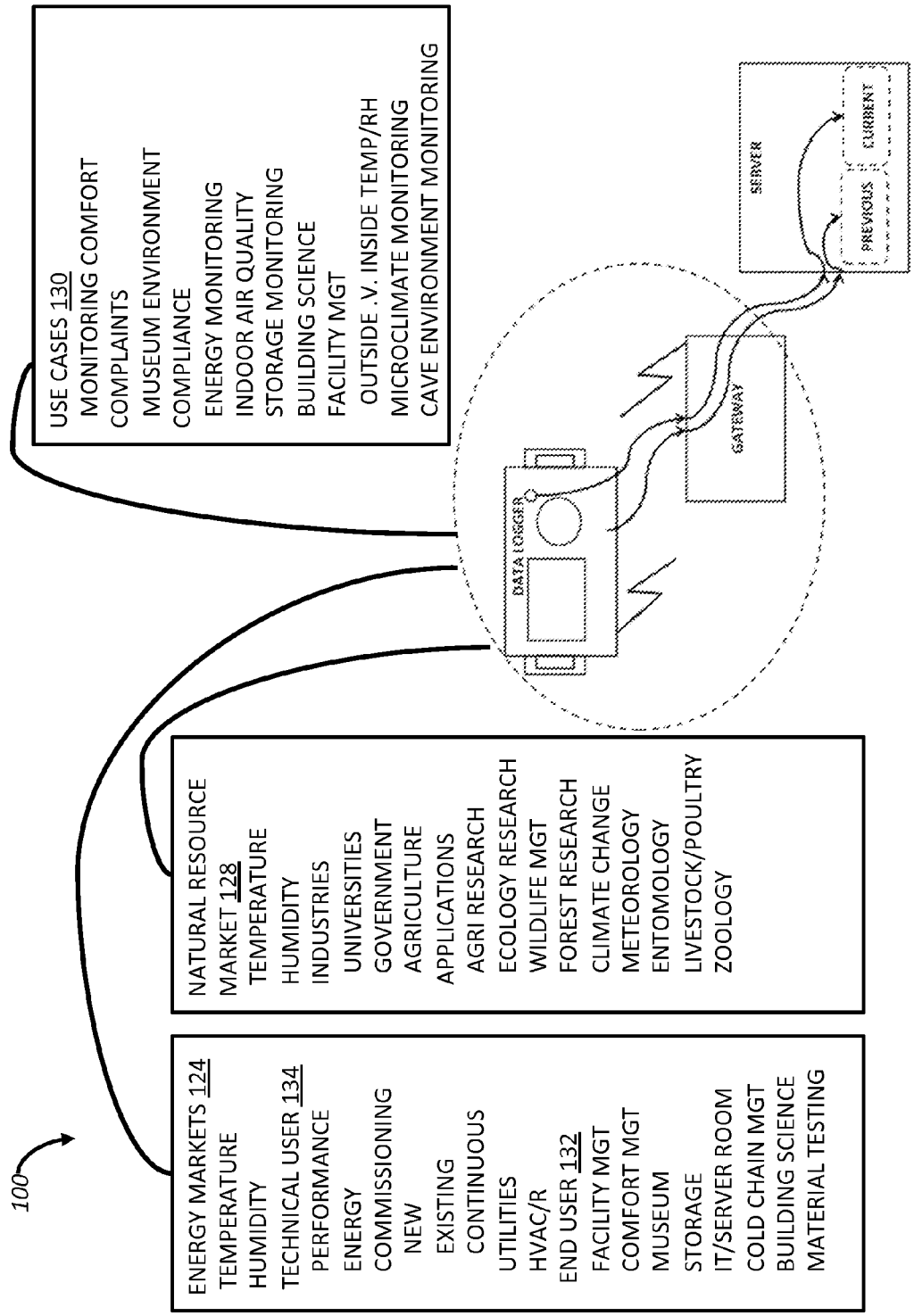
FIG. 1 depicts a system for explaining representative embodiments of communication of a wireless data logger.

The drawings referred to in this description are not to be understood as being drawn to scale except if specifically noted, and such drawings are only exemplary in nature.

DETAILED DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention.

The terms "comprises", "comprising", or any other variations thereof, are intended to cover a non-exclusive inclusion, such that a setup, apparatus or method that comprises a list of components or steps does not include only those components or steps but may include other components or steps not expressly listed or inherent to such setup or apparatus or method. In other words, one or more elements in a system or apparatus proceeded by "comprises . . . a" does not, without more constraints, preclude the existence of other elements or additional elements in the system or apparatus.

For the better understanding of the methods and systems of wireless data logger proximity-based detection and communication, reference will now be made to the embodiments illustrated in greater depth in the accompanying figures and description below. Further, in the following figures, the same reference numerals are used to identify the same elements.

FIG. 1 depicts a data logger system 100 for explaining representative embodiments of communication of a wireless data logger 102. The system 100 may include the data logger 102, a multi-network wireless mobile gateway 112 and a server 114. The data logger 102 may log data related to an environment in which the data logger 102 is deployed. Examples of the logged data may include temperature, humidity, pressure, 4-20 ma, AC current, AC voltage, acceleration, air velocity, amp hour, amps, barometric pressure, carbon dioxide, compression, air flow, conductivity, DC current, DC voltage, differential pressure, dissolved oxygen, event, gauge pressure, kilowatt hours, kilowatts, leaf wetness, light intensity, light on/off, motor on/off, occupancy, power factor, pulse input, rainfall, runtime, salinity, soil moisture, state open/closed, tilt, VOC, VAR, VARh, volt-amps, volts, water flow, water level, water temp, watt hours, watts w, wind; and the like.

One or sensors that may be embedded in the data logger 102 may sense a parameter of the environment. For example, a humidity sensor may log humidity of the atmosphere. Similarly, a temperature sensor may measure the temperature of the atmosphere. The various sensed environmental parameters may be stored in a memory 104. Based on detected proximity of the data logger 102 by the mobile gateway 112, the data logger 102 may communicate with server 114 and may transfer the stored data to the server 114 through the mobile gateway 112. Transfer to the server 114 may occur contemporaneously with the proximity detection, or may occur later while only the transfer to the gateway may occur when the mobile gateway 112 and data logger 102 are in low energy wireless communication proximity. This communication and transfer of the data along with various embodiments of methods and systems of proximity-based functionality of a data logger and gateway as described herein may be employed in a variety of markets and use cases 130.

Examples of the markets may include but may not be limited to various energy markets 124, natural resource markets 128, and the like. Deployments within the energy markets 124 may include scenarios for at least a technical user 134 and an end user 132. The technical user 134 can be a skilled person who may perform services in the energy markets 124 (e.g. for a fee). The technical user 134 may use the data collected from the data logger 102 for performance contracting, energy consulting, commissioning of new and existing buildings, utilities, HVAC/R, and the like. The end user 132 may use the data collected from the data logger 102 in facility management, comfort complaints, museum, storage, IT/Server room, cold chain management, building science, material testing, and the like.

Examples of deployments of the data logger 102 in the various natural resource markets 128 may include various industries, such as universities, government agencies, agricultural research, ecological research, wildlife research management, forestry research, climate change studies, meteorology, entomological research, livestock/poultry management, zoology, and others. Data loggers, and in particular the data logger system 100 may be employed to solve problems in a wide range of use cases 130 including monitoring comfort complaints, museum environment compliance, energy monitoring, indoor air quality management, storage monitoring, building science management, facility management, temperature and RH monitoring (SPA), microclimate monitoring, cave environment monitoring, and the like.

Figure 2:
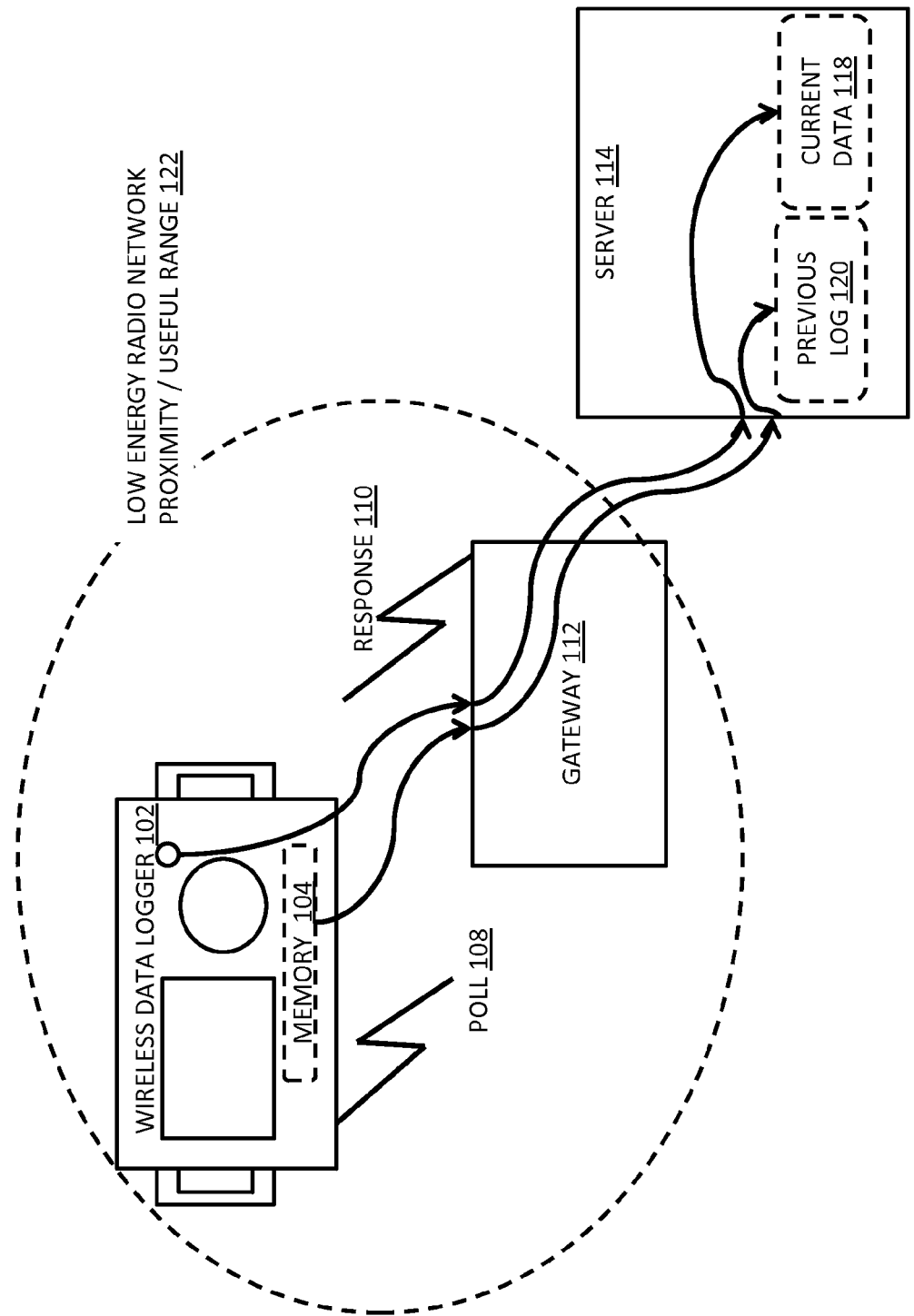
FIG. 2 illustrates a system for automatic proximity detection of a multi-network wireless mobile gateway by the wireless data logger over a low energy wireless network.

FIG. 2 illustrates the system 100 for automatic proximity detection of the data logger 102 over a low energy wireless network 122 by the mobile gateway 112. It may be noted that to describe the elements/process/system of FIG. 2, references will be made to the description of the elements of the FIG. 1.

The system 100 may include the data logger 102, a memory 104 for storing sensed data, the mobile gateway 112 and the server 114. The data logger 102 may be an energy efficient, autonomous wireless device with a low energy radio interface, such as BLUETOOTH LE over which the data logger 102 may communicate with the mobile gateway 112. Examples of the mobile gateway 112 include a mobile phone, personal digital assistant (PDA), and the like.

In an example, the data logger 102 may be capable of autonomously logging data without requiring direct connectivity to the gateway 112, under battery power for extended times by storing the sensed and logged data to memory 104 which may be a non-volatile memory. When in proximity to a gateway that is properly adapted, the data logger 102 may communicate via its low energy radio network (e.g. a BLUETOOTH low energy interface (hereinafter "BLE")) to a mobile device like smart phone, tablet, or the like. In turn, a mobile application operating on the mobile gateway may seamlessly synchronize the data associated with the data logger 102 to the server 114 via a wireless network, such as a cellular network, a Wi-Fi network, a WiMax network, and the like.

Communication over the low energy wireless network between the data logger 102 and the mobile gateway 112 may include discovery, configuration, status, data recovery, and the like. The discovery, configuration, status, and data recovery may include finding the data logger 102 in a field, setting up logging parameters or metadata for a deployment, seeing current readings, and other parameters, and getting all data autonomously logged from the data logger 102 into the mobile gateway 112 respectively.

Communication between a mobile application executing on the mobile gateway 112 that may facilitate interactions between the mobile gateway 112 and the server 114 may consist of data file management or smart synchronization. The smart synchronization may enable seamless communication when a plurality of data logger devices (like the data logger 102) are deployed and/or when different users running different mobile applications may be involved in different phases of discovery, configuration, status, and data recovery for a set of wireless data loggers.

As shown in FIG. 2, the data from the data logger 102 may be transferred automatically. The automatic transfer of the sensed data from the data logger 102 may include a portion of previously logged data 120 and/or real-time data 118. In some configurations, the sensed data may be transferred through the mobile gateway 112 to the server 114. In other configurations, the sensed data may be transferred to the gateway 112 where it may be temporarily stored. At a later time, the temporarily stored data may be forwarded to the server 114. The data transfer from the data logger 102 to the mobile gateway 112 may be via a low energy wireless network 122 and transfer from the mobile gateway 112 to the server 114 may be via a second network. Data may be automatically transferred in response to the mobile gateway 112 being within proximity detection range of the data logger 102 via the low energy wireless network 122. For example, a mobile phone configured with a low energy wireless network capability and having a specialized mobile application may automatically detect the presence of the data logger 102 when the distance between the two devices may be within the detectable range of the low energy wireless network 122. A detection process may involve a polling 108 and a response 110, such as is provided via BLUETOOTH low energy networking. On detection, the previous logged data stored in the memory 104 and/or the real time sensed data 118 may be transferred to the mobile gateway 112.

Automatic transfer of the real-time sensed data 118 may occur after each capture of sensed data or it may occur synchronously with a request for a real-time data transfer between the mobile gateway 112 and the data logger 102.

The previously logged data 120 may include a summary of the sensed data, such as a summary pertaining to the temperature measurement throughout a whole day/month/week, a summary pertaining to all prior logged data of the entire logger's deployment, and the like.

To ensure secure access of the logged data, the wireless data logger proximity detection by the mobile gateway 112 may require validation that the mobile gateway 112 may be authorized to access the data. The validation may be based on a wireless data logger-specific control key stored in the data logger 102. In a scenario, the data logger 102 may be provided with a control key during deployment. Whenever the mobile device (the mobile gateway 112) may come in detectable proximity range of the wireless data logger, validation of the stored control key may be required for the data logger 102 to perform the automatic transfer of the data. The control key may be validated by the mobile gateway 112 sending a validation key (e.g. that may be a replica of the control key) to the data logger 102 where it may be compared and validated. Alternatively, a secure application on the gateway may receive the control key from the data logger 102 (e.g. in an encrypted form) for validation. Control keys for validating and automatic transfers may be of different types and may indicate different access rights and privileges. It may be noted that there may be different control keys for the data logger 102. One such control key may be reserved for an administrator of the data logger 102 who may have all the privileges to configure and fetch data from the data logger 102. Other control keys may only authorize automatic transfer of the data and may not permit changing the configuration settings of the data logger 102. A set of data loggers may be configured with control keys that may have a common portion to facilitate authenticating access to any of the set of data loggers.

In an example, a mobile application executing on the mobile gateway 112, may notify a user of the mobile gateway 112 that the data logger 102 has been detected in range for further operation. The user may be asked for a control key pertaining to the data logger 102 to begin automatic transfer of the data. Any scripted operation beyond discovery may happen automatically and may notify the user that it was about to occur or should be authorized to occur so that the user may be given some level of control. In an example, a user may be walking near or through a building. When a particular wireless data logger (say the data logger 102) installed in a light fixture may be detected via the wireless proximity detection, a mobile application may be executed on the mobile gateway that detected the data logger to offload the entire logged datafile to it, and optionally synchronize the data to the server 114 without requiring any user interaction with the mobile gateway 112.

During the process of automatic notifications or operations, the mobile application may be running in the background on the mobile device. The mobile device may issue an alert when the data logger 102 is nearby. Examples of the alert may be a vibration, beep, and the like. The data transfer may begin automatically while the mobile application may be running in the background of the mobile device. The user may not have to take any specific action to initiate the transfer. In addition, the mobile application may not require being visible on the mobile device screen to do these automatic notifications and operations.

The data logger 102 may include an LCD screen having relative humidity sensor(s), and temperature sensor(s) accessible on the front face of the enclosure. In addition, the data logger 102 may include mounting loops disposed on its opposite ends, at least two data logger configuration buttons accessible on a surface and a low energy wireless communication port for proximity detection and data transfer. In addition, the data logger 102 may sense and log a wide range of conditions including without limitation: temperature, humidity, pressure, 4-20 ma, AC current, AC voltage, acceleration, air velocity, amp hour, amps, barometric pressure, carbon dioxide, compression, air flow, conductivity, DC current, DC voltage, differential pressure, dissolved oxygen, event, gauge pressure, kilowatt hours, kilowatts, leaf wetness, light intensity, light on/off, motor on/off, occupancy, power factor, pulse input, rainfall, runtime, salinity, soil moisture, state open/closed, tilt, VOC, VAR, VARh, volt-amps, volts, water flow, water level, water temp, watt hours, watts w, wind; and the like.

Figure 3:
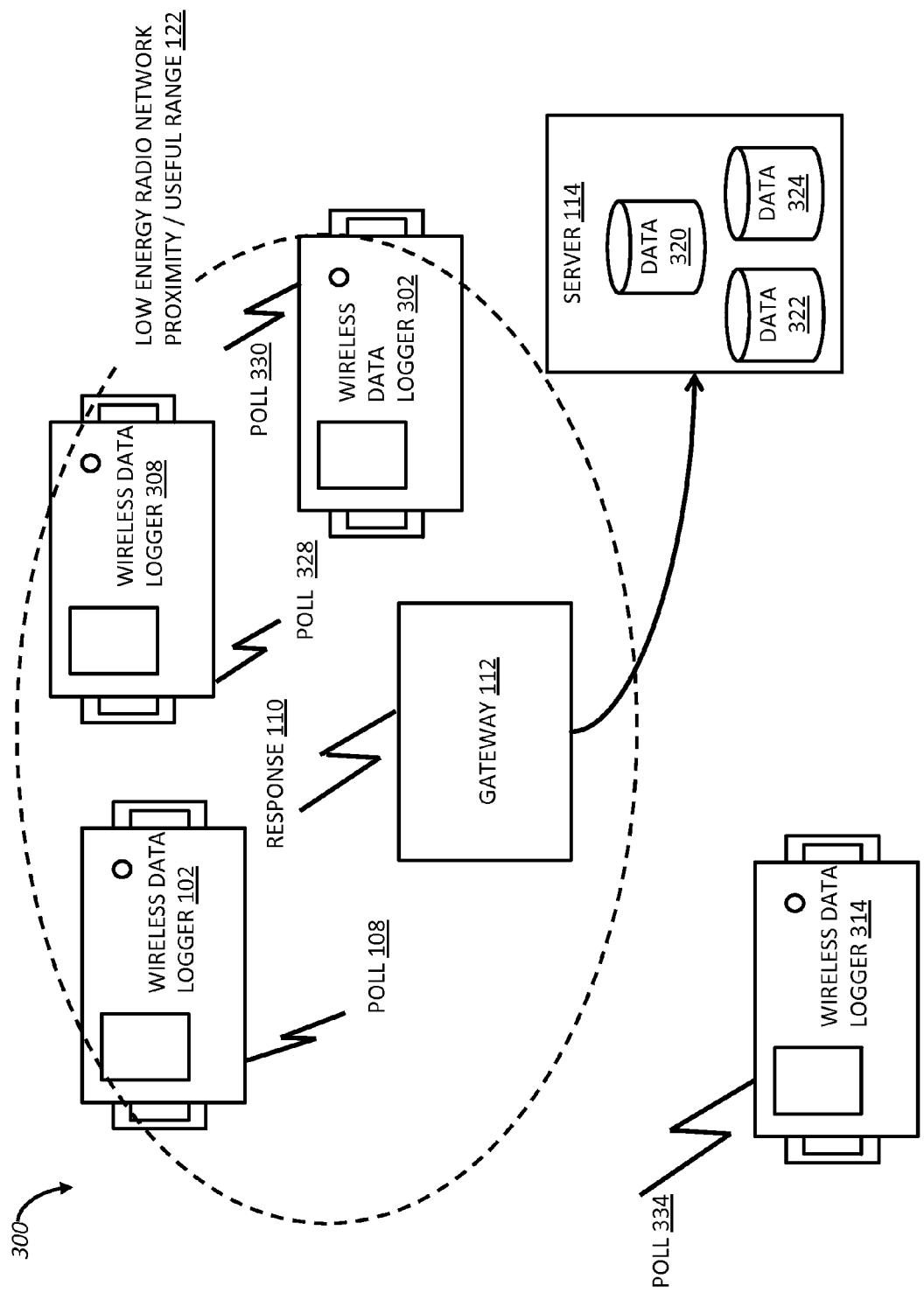
FIG. 3 illustrates a system for automatically offloading data from a plurality of wireless data loggers over the low energy wireless network.

FIG. 3 illustrates a system 300 for automatically offloading data from a plurality of wireless data loggers over a low energy wireless network.

As shown in FIG. 3, multiple data loggers 102, 302, 308 and 314 are shown as engaging in polling to seek a connection with the mobile gateway 112. The data loggers 102, 302 and 308 may transmit polling signals 108, 330, and 328 respectively via low energy radio signal and may get a response 110 from the mobile gateway 112, thereby being discovered via proximity detection over the low energy wireless network 122. Each data logger may automatically offload its data to the mobile gateway 112. Some of the data loggers (like the wireless data logger 314) may transmit a polling signal 334 but may get no response from the gateway 112 because it is too far apart for polling signal 334 to reach the gateway 112. Although FIG. 3 depicts the low energy radio network as a single oval shaped range, the extent of low energy radio signals from each wireless data logger may be represented as independent circles. When the gateway 112 comes into proximity of a data logger that is less than the extent of the low energy radio signals for the data logger, the gateway 112 may respond to the data logger's discovery polling signal, thereby establishing a low energy radio connection between a data logger and the gateway 112.

The offloading of the data from any of the data loggers may be independent of continued proximity detection of any of the other data loggers. In an example, offloading data for data logger 102 may be independent of continued proximity detection of data logger 308.

As stated for the above scenarios and others described herein, the proximity detection of any data logger may require validation that the multi-network wireless mobile gateway may be authorized to access the data logger. The validation may be based on a specific control key that may be stored in the data logger.

In addition to offloading logged data from the data loggers to the gateway, the offloaded logged data may be associated with a data logger and transmitted over a second radio network to a data logger server. By associating data logger offloaded data with the source of the offload data, data that is transmitted to the server may be maintained independently for each data logger. In FIG. 3, server-based data logger data 320 may be sourced from data logger 102; data logger data 322 may be sourced from data logger 308; and data logger data 324 may be sourced from the data logger 302.

Functions associated with offloading data from a data logger that are described in conjunction with FIG. 2 may beneficially be applied to any or all of the data loggers depicted in FIG. 3.

Any of the data loggers, such as those depicted in FIG. 3 may include an LCD screen, and/or a relative humidity sensor(s), and/or a temperature sensor(s) accessible on the front face of the enclosure. A data logger may also include mounting loops disposed on its opposite ends, at least two data logger configuration buttons accessible on a surface and a low energy wireless communication port for proximity detection and data transfer. In addition, data loggers may sense and log a wide range of conditions including without limitation: temperature, humidity, pressure, 4-20 ma, AC current, AC voltage, acceleration, air velocity, amp hour, amps, barometric pressure, carbon dioxide, compression, air flow, conductivity, DC current, DC voltage, differential pressure, dissolved oxygen, event, gauge pressure, kilowatt hours, kilowatts, leaf wetness, light intensity, light on/off, motor on/off, occupancy, power factor, pulse input, rainfall, runtime, salinity, soil moisture, state open/closed, tilt, VOC, VAR, VARh, volt-amps, volts, water flow, water level, water temp, watt hours, watts, wind, and the like.

Figure 4:
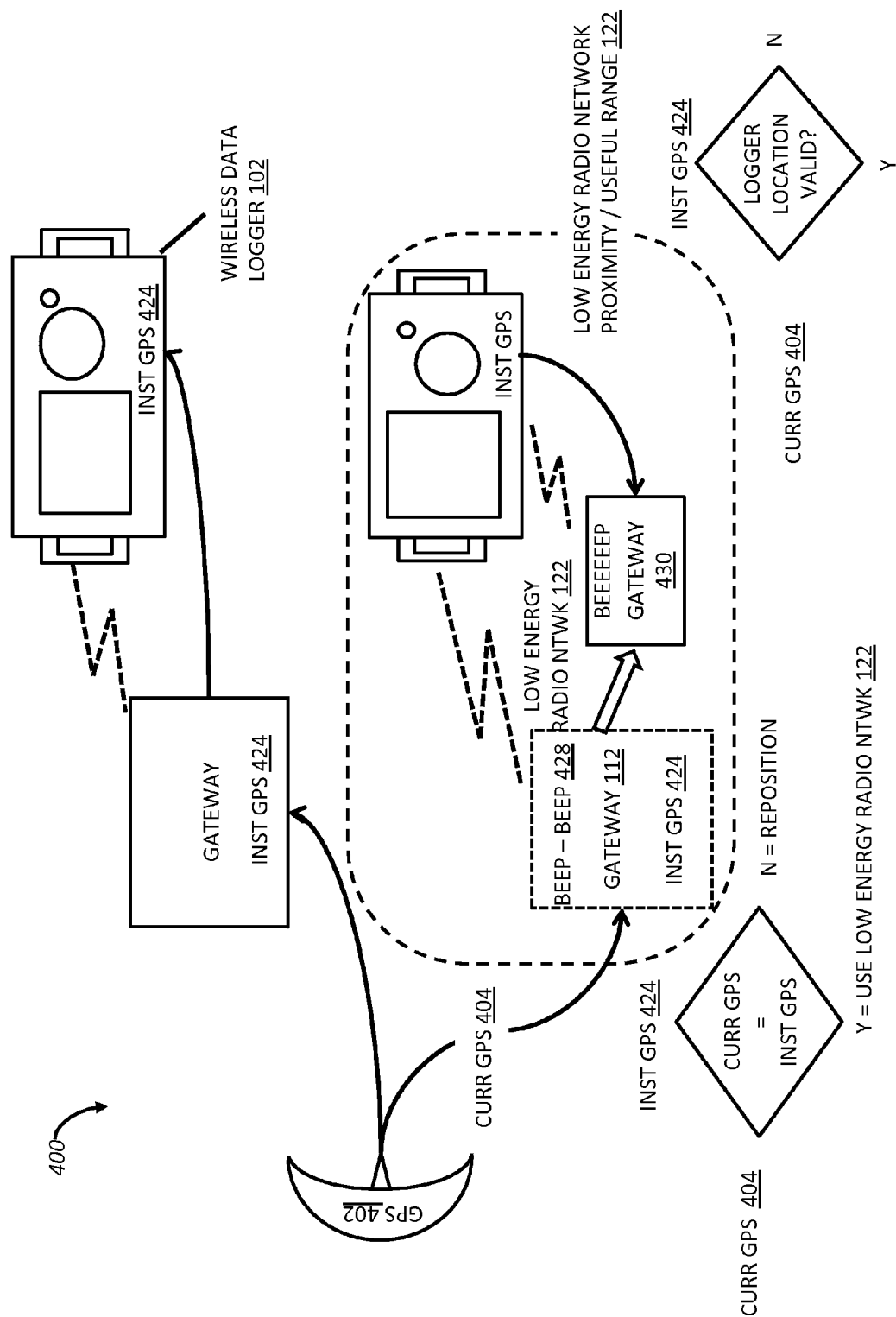
FIG. 4 illustrates a system for locating using Global Positioning System and validating a current location of a wireless data logger.

FIG. 4 illustrates a system 400 for locating and validating a location of a data logger using a Global Positioning System (hereinafter the GPS 402) and low energy radio signal strength measurement.

Upon data logger installation, a GPS location of the data logger installation site may be captured and recorded. The GPS installation site location 424 may be transmitted from the mobile gateway 112 to the data logger 102 via the low energy wireless network 122 and stored in a memory 104 on the data logger. This GPS installation site location may also be stored in a memory that is accessible by the mobile gateway 112, such as a memory location on the mobile gateway, a memory location in a networked data storage facility, and the like.

An estimated distance between the data logger 102 and the mobile gateway 112 may be calculated based on a measure of communication between them. This estimated distance may be stored in one or more memories, such as memory 104 of the data logger 102, a memory on the gateway, a networked memory accessible to the gateway, and the like.

At some time after data logger installation, the GPS installation site location may be retrieved by the mobile gateway 112 or some other mobile gateway that is suitably adapted with data logger interface software and low energy wireless network capabilities. A user may use the GPS capabilities of the mobile gateway to navigate the gateway to the GPS installation site location at which time the user may attempt to locate the installed data logger. Therefore, when a current GPS location 404 matches the installed GPS location 424, the low energy radio network may be used to discover the data logger. Because the low energy radio network extent covers an area that is typically larger than the degree of accuracy of a conventional GPS signal, once the user positions the gateway at the GPS installation location, it may be in detectable proximity of the data logger 102 and may be automatically detected.

To help the user more accurately locate the data logger, the user may activate a data logger distance improvement function on the gateway that provides feedback (e.g. an audible beep) that is indicative of the distance between the gateway and the data logger. As the gateway is brought closer to the data logger's physical position, the feedback will change and may ultimately transition from two distinct beeps 428 to a single consistent beep 430. Other forms of feedback are contemplated and some are described herein.

To validate the location of this nearby data logger 102, the stored GPS installation location 424 of the data logger 102 may be retrieved from the data logger memory and compared with a current GPS location of the mobile gateway 112 to determine if the current location of the data logger is the same as the installed location.

In an example, if the current GPS location 404 of the mobile gateway 112 is not equal to the GPS installed location 424 while the gateway is in communication with the data logger over the low energy radio network after being positioned based on the distance feedback algorithm described above, then it is possible that the data logger has been moved from it's installation location. This may happen when the data logger is installed in a location that may be subject to maintenance or some form of inspection and may unintentionally get moved to a new GPS location during the maintenance or inspection process.

The feedback for improving proximity of the gateway to the data logger may be in the form of an audio feedback, a visual feedback, a haptic feedback and the like. The feedback may be an audio feedback that may vary with volume, pitch, frequency, and tone based on a measure of distance between the data logger 102 and the mobile gateway 112. As shown in FIG. 4, when the multi-network wireless gateway 112 may be far (however in proximity range of the data logger 102) from the data logger 102, the parameters associated with the mobile gateway beep 428 (volume, pitch, frequency, color, brightness, flash rate, and duty cycle of the feedback) may be different from when the multi-network wireless gateway 112 is close from the data logger 102. The values of parameters that impact the feedback may be dependent on the distance of the wireless gate way 112 from the data logger 102. In an example, in a BLUETOOTH low energy (BLE) network, as the value of Received Signal Strength Indicator (RSSI) increases with the decrease in the distance between the data logger 102 and the mobile gateway 112, the values of the feedback parameters may change accordingly. In the example, the position of the multi-network wireless gateway 112 may be adjusted based on the parameters of the feedback. For example, a high frequency beep may signify a closer distance.

In addition, as stated above, the data logger 102 may include an LCD screen, relative humidity sensor(s), and temperature sensor(s) accessible on a front face of the enclosure. In addition, the wireless data logger 102 may include mounting loops disposed on its opposite ends, at least two data logger configuration buttons accessible on a surface and a low energy wireless communication port for proximity detection and data transfer. In addition, the wireless data logger 102 may sense and log a wide range of conditions including without limitation: temperature, humidity, pressure, 4-20 ma, AC current, AC voltage, acceleration, air velocity, amp hour, amps, barometric pressure, carbon dioxide, compression, air flow, conductivity, DC current, DC voltage, differential pressure, dissolved oxygen, event, gauge pressure, kilowatt hours, kilowatts, leaf wetness, light intensity, light on/off, motor on/off, occupancy, power factor, pulse input, rainfall, runtime, salinity, soil moisture, state open/closed, tilt, VOC, VAR, VARh, volt-amps, volts, water flow, water level, water temp, watt hours, watts, wind; and the like.

Data loggers may be available in a variety of sizes, shapes and environmental packaging. One such variety is a submersible data logger. The GPS based positioning of a gateway within GPS resolution of accuracy of the installed GPS location along with the feedback-based process for accurately detecting an installed data logger may be applied to such a submersible data logger.

An automatic proximity detection application executing on the gateway may include a validation step that ensures that the mobile gateway 112 is authorized to access the detected data logger (e.g. a submersible data logger) based on a wireless data logger-102 specific control key validation process that is described herein.

Figure 5:
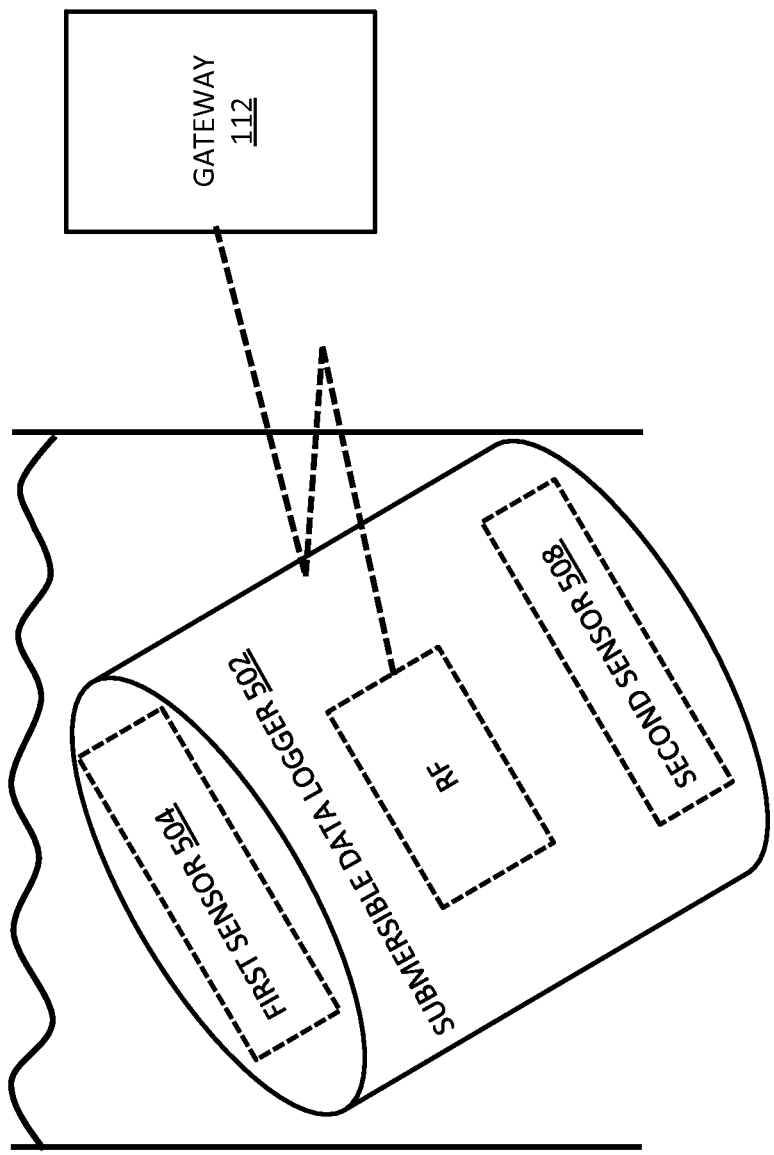
FIG. 5 illustrates a submersible wireless data logger.

FIG. 5 illustrates a submersible wireless data logger that is capable of automatic detection and data downloading via a wireless network to a mobile gateway. A submersible wireless data logger 502 may be utilized for sensing, logging and transmitting logged data in underwater environments. The submersible wireless data logger 502 may include a housing sealed to facilitate immersion in pressurized liquids. Further, the submersible wireless data logger 502 may include a first sensor 504 disposed in close proximity to a first sensing surface to sense conditions of the liquid (e.g. pressure). In addition, the submersible wireless data logger 502 may include a second sensor 508 disposed in close proximity to a second sensing surface to also sense conditions of the liquid. In embodiments, the first and second sensors may sense different conditions.

The first sensing surface and the second sensing surface may be opposite ends of the submersible wireless data logger 502. In addition to first and second sensors, the submersible data logger may be configured with an RF transceiver that may be a low energy compatible radio device for being discovered by and communicating with a gateway as is described elsewhere herein. In an example, a sensor for measuring the depth of the water may be disposed near the first sensing surface and sensor to measure the conductivity may be disposed near the second sensing surface. In addition, the submersible wireless data logger 502 may include a memory for sensing and storing data sensed by the two sensors. The different sensed data may include but may not be limited to pressure, temperature, salinity acceleration, flow, dissolved oxygen, water level, and the like of the liquid. Embodiments of a submersible data logger may not be limited to only two sensors so that one or more sensors may be configured into the data logger. Although the embodiment of FIG. 5 depicts the gateway disposed outside of the body of water, a submersible gateway could be used to reduce the distance between the gateway and the data logger, thereby improving the quality of radio communication between the two devices.

Figure 6:
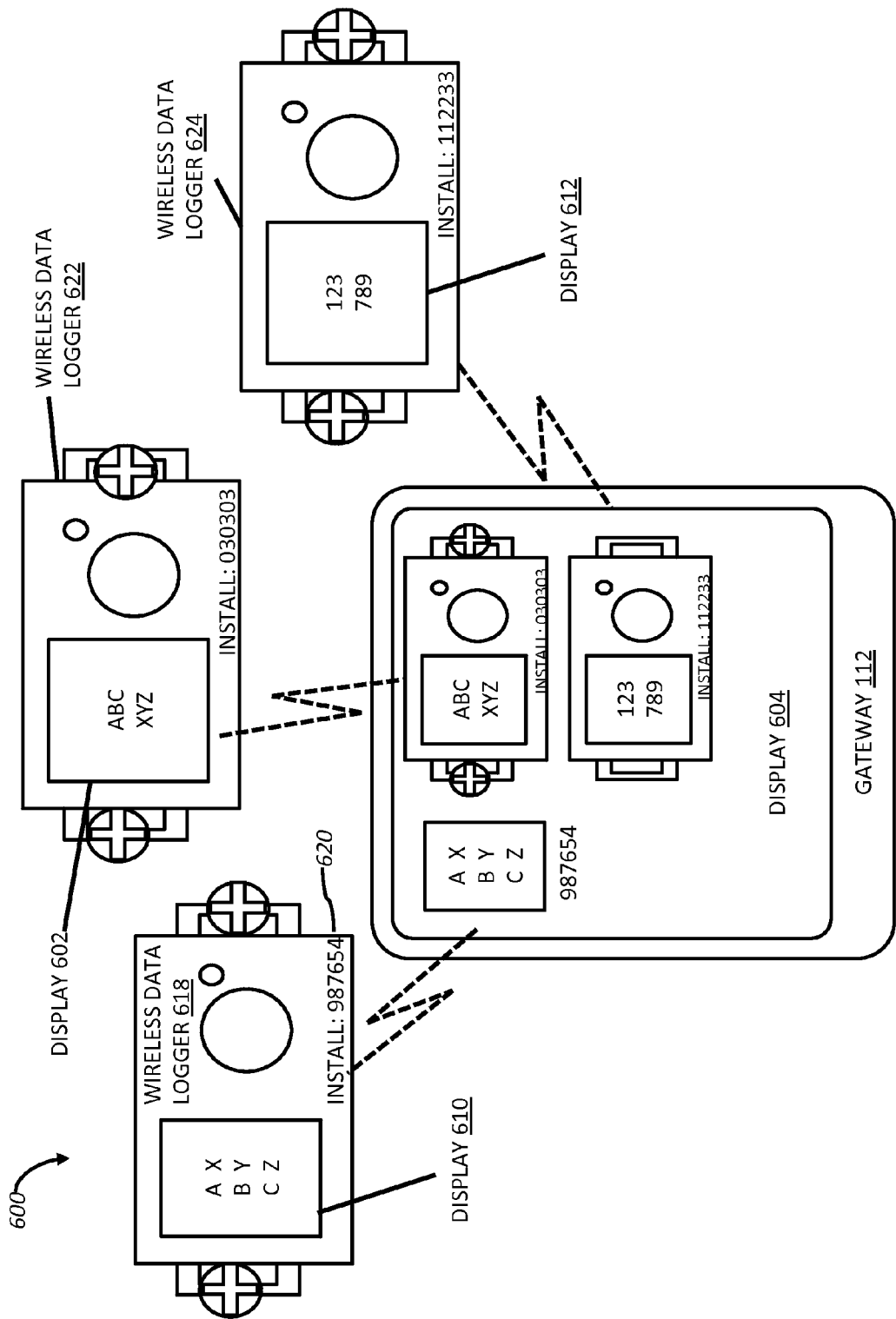
FIG. 6 illustrates a system for an automatic replication of a display of the wireless data logger on a display screen of the multi-network wireless mobile gateway.

FIG. 6 illustrates a system 600 for automatic replication of displays of wireless data loggers on a display screen of a mobile gateway, wherein the screens may be automatically replicated based on the mobile gateway detecting each wireless data logger via proximity detection via a low energy wireless network, such as BLUETOOTH LE. In the example depicted in FIG. 6, data loggers 618, 622, and 624 have been detected via low energy wireless networking by gateway 112. Upon detection, each data logger and the gateway communicate information suitable for the gateway to present an image on its display 604 that is consistent with the display of each data logger. In particular data logger 618, which may include display image 610 may be detected for such purposes. Display image 610 may be replicated on the gateway display 604. In addition data logger identifying information, such as a data logger installation number 620 may be transferred from the data logger to the gateway and displayed.

Another mode of automatically replicating a data logger display on a proximal mobile gateway may include presenting an image of the data logger, such as an image of the data logger that was captured when the data logger was installed.

Replication of data logger 622 may depict such a mode of data logger screen replication. In particular, a user may have captured an image of installed data logger 622, such as with a camera function of a gateway device, and stored the image in a memory accessible to the gateway (e.g. locally on the gateway, in network-based storage, such as on a data logging server, and the like). When data logger 622 is detected by a gateway via low energy radio network proximity detection, the data logger 622 may transmit information suitable for replicating it's display screen 602. Such information may include real-time updates of display data. The gateway may retrieve the captured image from the accessible memory by using an identification number of the data logger, and optionally use an installation code that may be provided to the gateway by the data logger after proximity detection to lookup the appropriate installation image. The gateway may then merge the installation image and display information from the data logger 622 to render a simulated image of the in-situ data logger with real-time display.

Yet another mode of automatic data logger screen replication of a proximity detected data logger display may include presenting a stock data logger image that fairly represents the detected data logger merged with real-time display replicating data from the detected data logger on the gateway screen. The replication of data logger 624 may utilize this mode of automatic replication. In particular, a stock image of a data logger model that is equivalent to data logger 624 may be accessible to the gateway in memory, such as a local gateway memory, network-based storage, and the like. When data logger 624 is detected by a gateway via low energy radio network proximity detection, the data logger 624 may transmit information suitable for replicating its display screen 612 as well as for determining a suitable stock image to be retrieved. Such information may include real-time updates of display data. The gateway may retrieve the stock image from the accessible memory by using an identification number of the data logger, and optionally use an installation code that may be provided to the gateway by the data logger after proximity detection to lookup the appropriate installation image. The gateway may then merge the stock image and display information from the data logger 624 to render a simulated image of the in-situ data logger with real-time display.

Although the embodiment of FIG. 6 references automatic data logger display replication, embodiments may include semi-automatic and on-demand replication. Semi-automatic data logger screen replication may include replication being initiated only after the user has requested such replication. On-demand replication may include replication only after a user has requested such replication and may either include a temporary representation of the data logger or may only update the data in the rendered data logger screen image when the user demands an update.

In the current scenario, one or more of the data loggers 618, 622, and 624 may include an LCD screen, relative humidity sensor(s), and temperature sensor(s) accessible on the front face of the enclosure. Any of these data loggers may also include mounting loops disposed on its opposite ends, at least two data logger configuration buttons accessible on a surface and a low energy wireless communication port for proximity detection and data transfer. Also, any of these data loggers may sense and log a wide range of conditions including without limitation: temperature, humidity, pressure, 4-20 ma, AC current, AC voltage, acceleration, air velocity, amp hour, amps, barometric pressure, carbon dioxide, compression, air flow, conductivity, DC current, DC voltage, differential pressure, dissolved oxygen, event, gauge pressure, kilowatt hours, kilowatts, leaf wetness, light intensity, light on/off, motor on/off, occupancy, power factor, pulse input, rainfall, runtime, salinity, soil moisture, state open/closed, tilt, VOC, VAR, VARh, volt-amps, volts, water flow, water level, water temp, watt hours, watts, wind; and the like.

Figure 7:
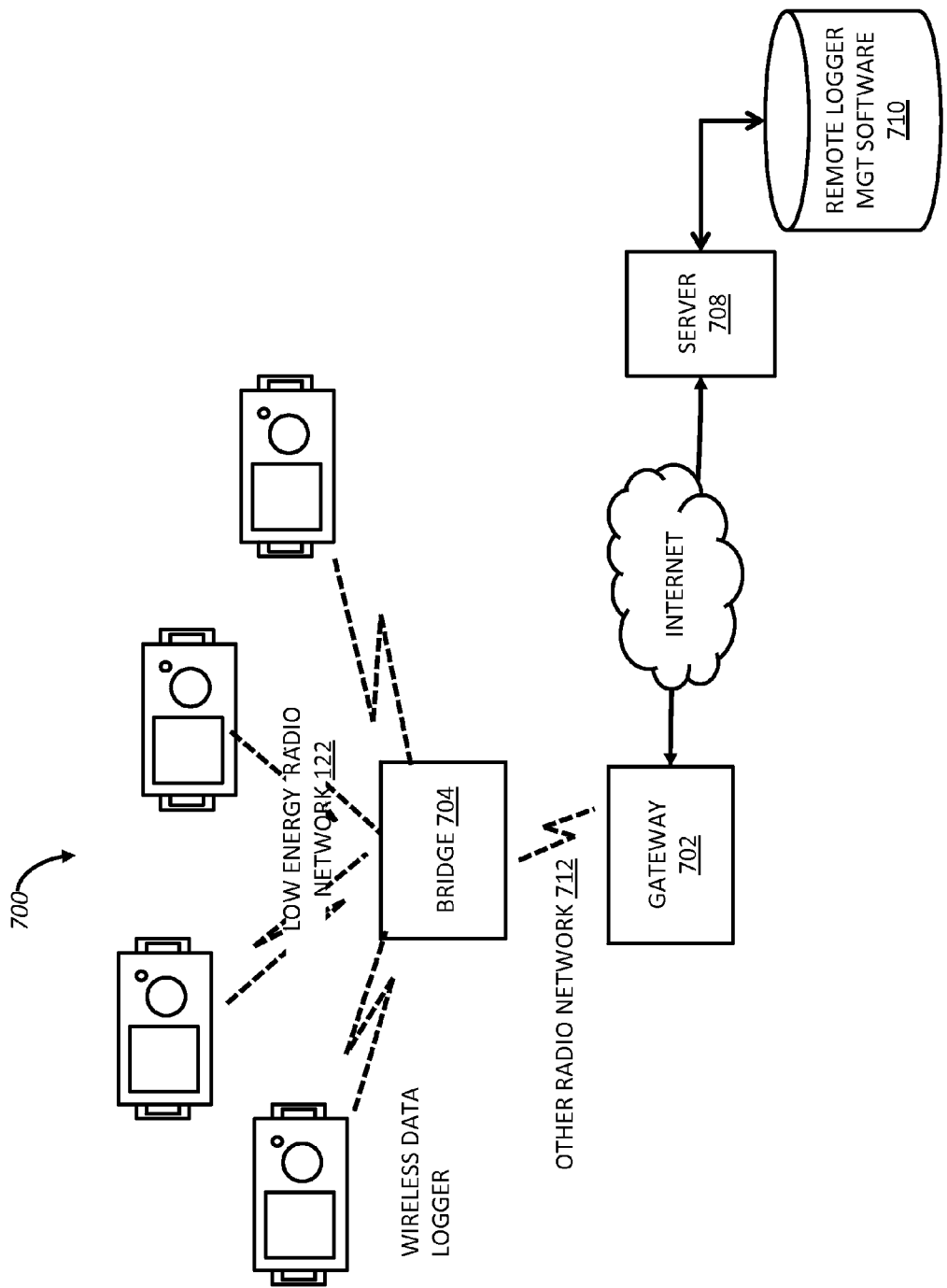
FIG. 7 illustrates a system for communication of a plurality of wireless data loggers with a remote data logger monitoring and management software.

FIG. 7 illustrates a system 700 for communication of a plurality of wireless data loggers via a low energy radio network to a multi wireless network bridge and then through a mobile gateway over the Internet to a server executing remote data logger monitoring and management software. Such a configuration may be suitable for collecting information from data loggers over longer periods of time so that more sensed data samples may be stored on the bridge than could be held in any one of the data loggers. When a mobile gateway 702 that may be configured similarly to gateway 112 described elsewhere herein engages with the bridge 704, the collected sensed data may be transferred to the gateway 702 for forwarding over the Internet to a remote data logger management server 708 executing remote data logger management applications 710.

The multi network capable wireless bridge 704 may communicate with the data loggers via a low energy radio network, such as network 122. The bridge 704 may also be capable of communicating with a gateway, such as mobile gateway 702 via a second radio networking capability 712. Examples of wireless network 710 may include but may not be limited to cellular network, Wi-Fi and WiMax. The Internet capable gateway 702 may communicate via the Internet with a web server 708. Through this chain of devices and networks, the sensed and logged data of the data loggers may be accessible by remotely located users, such as by users who may have access to the server 708. The techniques of automatic data logger proximity detection and offloading of data logger data described elsewhere herein may be used in the current scenario to facilitate autonomous detection and downloading of data from the data loggers via the bridge.

In the current scenario, any of the data loggers may include an LCD screen, relative humidity sensor(s), and temperature sensor(s) accessible on the front face of the enclosure. Alternatively any of the data loggers may include mounting loops disposed on its opposite ends, at least two data logger configuration buttons accessible on a surface and a low energy wireless communication port for proximity detection and data transfer. In addition, any of the data loggers depicted in FIG. 7 may sense and log a wide range of conditions including without limitation: temperature, humidity, pressure, 4-20 ma, AC current, AC voltage, acceleration, air velocity, amp hour, amps, barometric pressure, carbon dioxide, compression, air flow, conductivity, DC current, DC voltage, differential pressure, dissolved oxygen, event, gauge pressure, kilowatt hours, kilowatts, leaf wetness, light intensity, light on/off, motor on/off, occupancy, power factor, pulse input, rainfall, runtime, salinity, soil moisture, state open/closed, tilt, VOC, VAR, VARh, volt-amps, volts, water flow, water level, water temp, watt hours, watts, wind; and the like.

A mobile gateway, such as mobile gateway 112 or mobile gateway 702 may support voice based commands, touch based commands, gestures, and the like. These commands may initiate different actions. For example, a voice based command 'offload' may initiate the offloading operation of a detected data logger. In addition, drawing an 'O' on a touch screen of the gateway may initiate the offloading operation. Any operation that the gateway is capable of performing may be initiated or terminated via by voice commands, touch commands, gestures, and the like.

In addition to automatic downloading of data logger data via mobile gateway as described herein, additional actions may be communicated between the gateway and the data logger, such as commands related to configuring, reconfiguring, restarting, clearing, calibrating, redeploying, and other data logger related actions. These actions may be automatically communicated to the data logger from the gateway. These actions may also be retrieved by the gateway from a server in response to the gateway transferring data downloaded from the data logger. Alternatively, the actions may be stored in a memory, such as a network accessible memory to which the gateway has access. The gateway may access the actions in response to automatically detecting a data logger as described herein. Such actions may be referred to as scripts or scripting actions that may be processed and/or executed by the gateway. Scripting actions may be established per data logger, for a group of data loggers (e.g. all data loggers deployed at a site), for all data loggers detected by the gateway, and the like.

We now explore various deployment scenarios to provide examples of use of the methods and systems related to automatic sensed data downloading, screen replication, and proximity detection of a data loggers. Generally these scenarios refer to energy markets, natural resource markets, and use cases of FIG. 1.

In an exemplary scenario, a technical user 134 while doing energy consulting may desire to record the temperature and humidity of an environment. The consultant may deploy a data logger, such as data logger 102 in the environment using one or more of the methods described herein. The data logged by the deployed data logger may be automatically sent to his multi network wireless mobile gateway 112 when he brings it within low energy radio network proximity of the deployed data logger. A server, such as server 114 or server 708 may receive and store the sensed data information along with data logger identification information from the multi network wireless mobile gateway 112.

In another exemplary scenario, an end user 132 may be interested in monitoring the temperature of a cold chain setup. After deploying a data logger, he may use a multi-network wireless mobile gateway configured for automatic detection and downloading of data logger data as is described herein and come in useful range of the data logger's low energy radio network to view the temperature captured by the data logger. This temperature information may be automatically sent to his mobile gateway via the automatic data download methods and systems described herein.

In yet another exemplary scenario, a user doing research in forestry may be keen to analyse the temperature and humidity over time of a particular outdoor space. He may seek that information from a temperature and humidity sensing data logger (or from two data loggers configured for temperature or humidity sensing but not both) by coming in low energy radio network range of the data logger(s) with a properly configured gateway. The sensed data may be transferred from the data logger(s) to the gateway upon proximity detection of the data logger(s) by the gateway using the methods described herein. The sensed data gathered by the gateway may optionally be sent to a server over a second wireless network over which the multi network wireless mobile gateway is capable of accessing.

In yet another exemplary scenario, in a local museum or library, it may be important to monitor temperature and relative humidity so that an alarm may be activated if a temperature and/or humidity threshold is crossed. As an additional safety measure, a security guard may carry a gateway that is capable of the automatic detection and downloading capabilities of gateway 112 described herein while on his rounds to download and manually confirm the temperature and/or humidity sensed by data loggers deployed in the museum is below the alarm threshold. In addition to manual confirmation, automatic confirmation, redeployment and the like, such as actions described above herein may be performed by the gateway in this scenario.

In yet another exemplary scenario, a performance consultant working at a remote office may desire to analyze various utilities of a firm that may be situated at a distant place in which multiple wireless data loggers, such as data logger 102 may be installed. A multi-radio network enabled wireless bridge may enable receiving data from the multiple data loggers at the distant place. When a user at the distant place causes the bridge and a mobile Internet connected gateway to communicate, the data from the data loggers may be transferred through the bridge via the gateway over the Internet to a server that is accessible to the consultant. The performance consultant may access the data logger data stored on the server to view and analyze it as needed to validate performance objectives.

While several possible embodiments of methods and systems related to data logger deployment, automatic data collection and transfer, screen replication, and other have been described above and illustrated in some cases, it should be interpreted and understood as to have been presented only by way of illustration and example, but not by limitation. Thus, the breadth and scope of a preferred embodiment should not be limited by any of the above-described exemplary embodiments.

Common forms of non-transitory computer-readable storage medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer may read.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A method comprising:
    automatically detecting a wireless data logger with a multi-network wireless mobile gateway via low energy radio network-based proximity detection;
    automatically transferring data logger sensed data that includes a portion of previously logged data from the wireless data logger via the low energy network to a multi-network mobile wireless gateway, wherein automatically transferring is in response to the automatically detecting the wireless data logger; and
    transferring the logged data from the multi-network wireless mobile gateway to a host via a second network, wherein the wireless data logger comprises an LCD screen visible on a front face of an enclosure, at least one of a relative humidity sensor and a temperature sensor accessible on the front face of the enclosure, mounting loops disposed on opposite ends of the wireless data logger, at least two wireless data logger configuration buttons accessible on a surface of the wireless data logger, and a low energy wireless communication port for proximity detection and data transfer.

2. The method of claim 1, wherein the wireless data logger senses and logs temperature.

3. The method of claim 1, wherein the wireless data logger senses and logs temperature and relative humidity.

4. The method of claim 1, wherein the wireless data logger is submersible in a liquid.

5. The method of claim 4, wherein the wireless data logger senses and logs pressure of the liquid.

6. A method of wireless data logger location validation, comprising:
   determining a GPS location of a wireless data logger installation site;
   transmitting the GPS installation site location from a mobile gateway to the wireless data logger via a low energy wireless network, and storing the GPS installation site location into a memory accessible by the gateway;
   using the GPS installation site location to position a multi-network wireless mobile gateway substantially at the installation site location
   automatically detecting proximity of the wireless data logger via wireless low energy network-based proximity detection with the positioned multi-network wireless mobile gateway device;
   adjusting a position of the multi-network wireless mobile gateway to reduce the estimated distance between the gateway and the logger based on feedback indicative of a distance between the gateway and the wireless data logger;
   retrieving the GPS installation site location from the wireless data logger; and
   comparing a current GPS location of the gateway with the retrieved GPS installation site location to validate wireless data logger location.

7. The method of claim 6, wherein the feedback indicative of a distance between the gateway and the wireless data logger is based on a measure of communication between the gateway and the wireless data logger via the low-energy wireless network.

8. The method of claim 6, wherein the feedback is an audio feedback that varies in at least one of volume, pitch, frequency, and tone based on a measure of distance between the wireless data logger and the gateway.

9. The method of claim 6, wherein the feedback is presented on the gateway display screen and varies in at least one of color, brightness, flash rate, numerical value, and duty cycle based on a measure of distance between the wireless data logger and the gateway.

10. A wireless data logger comprising:
    a housing sealed to facilitate immersion in pressurized liquids;
    a plurality of sensors for sensing at least two distinct properties of the liquid;
    a memory for holding a plurality of sensor sensing values received from the plurality of sensors;
    a low energy wireless network capability; and
    a processor for executing an automatic proximity detection program that includes the steps of:
        transmitting a detection data value over a network with the low energy wireless network capability to facilitate automatic detection of the wireless data logger by a multi-network wireless mobile gateway;
        determining if a response is received via the network; and
        based on a result of determining if a response is received, performing one of pausing for a minimum duration and then retransmitting the detection data value over the network, and automatically transferring data logger sensed data that includes a portion of previously logged data via the network with a multi-network wireless mobile gateway that provided the response, wherein the logged data is transferred from the multi-network wireless mobile gateway to a host via a second network.

11. The system of claim 10, wherein a first sensor of the plurality of sensors is disposed in close proximity to a first sensing surface of the wireless data logger to sense a first property of a liquid, and a second sensor of the plurality of sensors is disposed in close proximity to a second sensing surface of the wireless data logger to sense a second property of a liquid, wherein the first and second sensing surfaces comprise opposite sides of the wireless data logger.

12. A method comprising:
    automatically replicating a display of a plurality of wireless data loggers automatically on a display screen of a multi-network wireless mobile gateway while the gateway and wireless data loggers communicate via a low energy wireless network, wherein data for replicating the wireless data logger displays is transferred from the wireless data loggers to the gateway via the wireless low energy network, and wherein the automatic replication is in response to automatic wireless low energy network-based wireless data logger proximity detection of each of the plurality of wireless data loggers by the wireless mobile gateway;
    automatically transferring data logger sensed data that includes a portion of previously logged data from at least one automatically detected wireless data logger via the low energy network to the gateway; and
    transferring the logged data from the multi-network wireless mobile gateway to a host via a second network.

13. A method comprising:
    automatically detecting at least one of a plurality of wireless data loggers with a multi-radio network enabled wireless bridge, wherein the plurality of wireless data loggers communicates with the multi-radio network enabled wireless bridge via low energy wireless networking;
    communicating from the multi-radio network enabled wireless bridge via a wireless network other than low energy wireless networking with an Internet gateway; and
    executing remote wireless data logger monitoring and management software on a web server, wherein the Internet gateway communicates with the web server, and wherein the wireless data logger data that includes a portion of previously logged data is automatically transferred from the plurality of wireless data loggers via the bridge to the Internet gateway and then to the web server where the wireless data logger data is accessible by a plurality of remotely located users.

* * * * *